3,389,956
DYEING NICKEL-MODIFIED POLYPROPYLENE TEXTILES WITH AN ACYL DIHYDROXYBENZENE AZO DYE
Reinhard Mohr, Offenbach (Main), and Fritz Osterloh, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed July 19, 1965, Ser. No. 473,226
Claims priority, application Germany, July 25, 1964, F 43,562
5 Claims. (Cl. 8—42)

ABSTRACT OF THE DISCLOSURE

Nickel modified polypropylene textiles are dyed with an acyl-, O,O'-dihydroxy or O-hydroxy, O'-carboxy azo dye of the following formula:

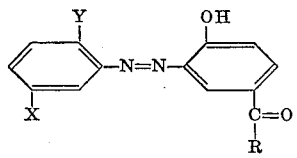

where X is a nitro or chloro group, R is a lower alkyl, phenyl, chlorophenyl, lower alkoxyphenyl lower alkyl phenyl or benzyl group and Y is an OH group or a COOH group when an acetyl group is the RC=O- group. Specifically enumerated in the specification are 5-propionyl-, 5-butyryl-, 5-benzoyl-, 5-phenacetyl-, 5-methylbenzoyl-, 5-methoxybenzoyl- and 5-hexahydrobenzoyl-, 2,4-dihydroxy-, 5-chloro-2'-hydroxyazobenzene, and 5-acetyl-, 2,4-dihydroxy-, 2'-carboxy-, and 2'-hydroxy-, 5'-nitroazobenzene analogues. Carriers can be used to assist the dyeing.

---

It is known that O,O'-dihydroxy- and O-hydroxy-O'-carboxylic azo dyestuffs are suitable for dyeing textile material of nickel-containing polypropylene (Belgian Patent No. 632,652).

Now we have found that textile material of nickel-containing polypropylene can be dyed and printed deep shades of excellent fastness properties by using azo dyestuffs of the general formula

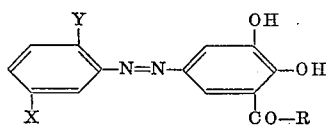

wherein R repersents an alkyl, aryl, cycloalkyl or aralkyl radical, X represents a hydrogen or halogen atom or a nitro group, and Y stands for a hydroxy or carboxy group. The dyeing is effected by treating the textile material or polypropylene containing 0.05 to 1% of nickel, at temperatures within a range of about 90° to about 140° C. in an aqueous dyeing bath which contains the dyestuff and, if required, a carrier, and by finishing the dyeing obtained in the usual manner. It is of advantage, but not necessary to add a wetting or dispersing agent.

The printing is suitably carried out by dissolving the dyestuff in an appropriate solvent, for example in dimethyl formamide and by stirring the dyestuff solution into an appropriate thickening agent, for example crystal gum. After applying the printing paste which may contain further printing adjuvants, the printed tissue is steamed at temperatures ranging from 101° C. to about 140° C. and then treated as usual.

It is also possible to add to the printing paste carriers. Appropriate carriers are for example di- and trichlorobenzenes chloronaphthalenes, methylnaphthalenes, benzoic acid butyl esters, o-phenylphenol or hydroxytoluenecarboxylic acid methyl esters. The dyeing and steaming is suitably carried out in a neutral to weakly acid medium.

The dyestuffs used according to the present invention have a good affinity for the textile material of nickel-containing polypropylene and produce chiefly yellow and brown dyeings or prints of good fastness to wetting and light as well as of good fastness to solvents and rubbing.

The azo dyestuffs used according to the present invention can be obtained in the usual manner by coupling the correspondingly diazotised aminophenols or anthranilic acids with 1-acyl-2,4-hydroxybenzenes, such as 1-acetyl-, 1-propionyl-, 1-butyryl-, 1-benzoyl-, 1-(4'-chloro)benzoyl-, 1-phenyl acetyl- or 1-hexahydrobenzoyl-2, 4-dihydroxybenzene.

The following examples serve to illustrate the present invention but they are not intended to limit it thereto, the parts being by weight and the relationship of parts by weight to parts by volume being that of the kilogram to the litre.

EXAMPLE 1

10 parts of a polypropylene thread of staple fiber having a single titer of 3 deniers and a content of 0.75% by weight of the nickel compound of 3,3'-dihydroxy-5,5'-dioctyl-diphenylsulfone, are washed for 30 minutes at 60° C. with an aqueous solution containing per litre 0.3 g. of the addition product of 1 mol of nonylphenol and 11 mols of ethylene oxide, rinsed and subsequently treated without intermediate drying in a bath containing in 400 parts of water 0.1 part off acetic acid, 0.04 part of di-butylnaphthalene sulfonic acid sodium, 0.3 part of di-naphthylmethane-disulfonic acid and 0.2 part of the dyestuff obtained by coupling diazotised 1-amino-2-hydroxy-5-chlorobenzene with 1-benzoyl-2,4-dihydroxy-benzene. After dyeing for 10 minutes at room temperature the temperature of the dye bath is raised within 45 minutes to 100° C. and the whole is dyed for 2 hours at this temperature. The thread which has been dyed is then rinsed hot and cold, washed for 30 minutes at 80° C. with an aqueous solution containing per litre 1 g. of the addition product of 1 mol of nonylphenol and 11 mols of ethylene oxide and 0.4 g. of sodium carbonate, rinsed and dried.

The brown dyeing obtained has very good fastness to washing, sweat, solvents, light and rubbing.

EXAMPLE 2

10 parts of a polypropylene thread of staple fiber having a single titer of 3 deniers and a nickel content of 0.05% by weight are dyed in the dye bath described in Example 1 under the conditions of Example 1, using, however, 0.2 part of the azo dyestuff obtained by coupling diazotised 1-aminobenzene-2-carboxylic acid with 1-benzoyl-2, 4-dihydroxybenzene and adding 2 parts of methyl naphthalene.

A yellow dyeing of very good fastness to light, washing, sweat, solvents and rubbing is obtained.

EXAMPLE 3

50 parts of the dyestuff of diazotised 1-amino-2-hydroxy-5-chlorobenzene and 1-acetyl-2,4-dihydroxybenzene are dissolved in 300 parts of dimethyl formamide. The solution is stirred into 600 parts of an aqueous crystal gum thickening of 25% by weight and mixed with 50 parts of ammonium sulfate.

A polypropylene tissue is printed with the printing paste thus obtained according to the film printing method. The printed tissue is dried and steamed for 30 minutes at 1.5 gauge pressure, rinsed thoroughly, after-treated for 30 minutes at 80° C. with 1 g. of the resultant product of about 10 mols of ethylene oxide acting on 1 mol of nonylphenol and 0.5 g. of calcinated soda in one litre of water, then rinsed and dried. A deep brown print of good fastness to wetting is obtained.

EXAMPLE 4

10 parts of a polypropylene thread of staple fiber having a single titer of 3 deniers and a nickel content of 0.05% by weight are washed for 30 minutes at 60° C. with an aqueous solution containing per litre 0.3 g. of the addition product of 1 mol of nonylphenol and 11 mols of ethylene oxide, rinsed and subsequently treated without intermediate drying on a high temperature dyeing apparatus in a bath which contains in 400 parts of water 0.1 part of acetic acid, 0.04 part of dibutylnaphthalene sulfonic acid sodium and 0.2 part of the azo dyestuff obtained by coupling diazotised 1-amino-2-hydroxy-5-nitrobenzene with 1-acetyl-2,4-dihydroxybenzene. After dyeing for 10 minutes at room temperature the temperature of the dye bath is raised within 60 minutes to 120° C. and dyeing is carried out at this temperature for 2 hours. The dyed thread is subsequently rinsed hot and cold, washed for 30 minutes at 80° C. with an aqueous solution containing per litre 1 g. of the addition product of 1 mol of nonylphenol and 11 mols of ethylene as well as 0.4 g. of sodium carbonate, rinsed and dried. A reddish brown dyeing of very good fastness to light, washing, sweat, solvents, and rubbing is obtained.

The following table lists further dyestuffs to be used according to the present invention and the shades obtained by said dyestuffs:

|  | Dyestuff | Shade |
|---|---|---|
| 1-aminobenzene-2-carboxylic acid. | 1-acetyl-2,4-dihydroxybenzene. | Yellow. |
| 1-amino-2-hydroxy-5-nitrobenzene. | 1-benzoyl-2,4-dihydroxybenzene. | Brown. |
| 1-aminobenzene-2-carboxylic acid. | 1-butyryl-2,4-dihydroxybenzene. | Yellow. |
| 1-amino-2-hydroxy-5-nitrobenzene | 1-(4'-chloro)-benzoyl-2,4-dihydroxybenzene. | Brown. |
| 1-amino-2-hydroxy-5-chlorobenzene | 1-phenacetyl-2,4-dihydroxybenzene. | Yellow-brown. |
| Do | 1-(4'-methyl)-benzoyl-2,4-dihydroxybenzene. | Brown. |
| Do | 1-(3'-methoxy)-benzoyl-2,4-dihydroxybenzene. | Do. |

We claim:

1. A process for producing fast dyeings and prints on a textile material consisting of nickel containing polypropylene, which comprises applying to said textile material in an aqueous medium an azo-dyestuff of the formula

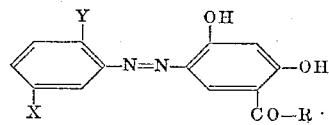

in which R represents lower alkyl, phenyl, chlorophenyl, lower alkylphenyl, lower alkoxyphenyl or benzyl, X represents hydrogen, chlorine or nitro, and Y represents hydroxyl or carboxyl.

2. The process defined in claim 1, wherein the textile material is dyed in an aqueous bath between about 90° and about 140° C.

3. The process defined in claim 1, wherein the dyestuff is printed on the textile material by means of a printing paste and the pirnts so obtained are subsequently steamed between about 101° C. and about 140° C.

4. The process defined in claim 1, wherein the polypropylene of the textile material to be colored contains from 0.5 to 1 percent by weight nickel.

5. The process defined in claim 2, wherein the dyeing is carried out along with a carrier.

References Cited

UNITED STATES PATENTS 3,186,788   6/1965   Mills _____ 8—55
3,244,694   4/1966   May et al. _____ 8—41

NORMAN G. TORCHIN, *Primary Examiner.*

D. LEVY, *Assistant Examiner.*